United States Patent
Takamizawa

(10) Patent No.: US 9,784,959 B2
(45) Date of Patent: Oct. 10, 2017

(54) MICROSCOPE APPARATUS FOR PREVENTING UNNECESSARY DEGRADATION OF A LIGHT DETECTOR

(71) Applicant: OLYMPUS CORPORATION, Shibuya-ku, Tokyo (JP)

(72) Inventor: Nobuhiro Takamizawa, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 98 days.

(21) Appl. No.: 14/191,161

(22) Filed: Feb. 26, 2014

(65) Prior Publication Data

US 2014/0247337 A1    Sep. 4, 2014

(30) Foreign Application Priority Data

Mar. 4, 2013 (JP) .................................. 2013-041685

(51) Int. Cl.
   G02B 21/36    (2006.01)
   G02B 21/00    (2006.01)

(52) U.S. Cl.
   CPC ....... G02B 21/008 (2013.01); G02B 21/0076 (2013.01)

(58) Field of Classification Search
   CPC ...... G01J 3/36; G01J 3/2803; G02B 21/0064; G02B 21/008; G02B 21/0076;
   (Continued)

(56) References Cited

U.S. PATENT DOCUMENTS 5,687,104 A * 11/1997 Lane ..................... H03G 5/005
                                                    708/300
5,689,116 A * 11/1997 Heukensfeldt
                         Jansen .................. G01T 1/1648
                                                    250/363.07

(Continued)

FOREIGN PATENT DOCUMENTS

JP    2004506191 A    2/2004
JP    2005243554 A    9/2005

(Continued)

OTHER PUBLICATIONS

Kuwabara et a, Machine generated translation of JP 2011-100058A, May 2011.*

(Continued)

Primary Examiner — David Harvey
(74) Attorney, Agent, or Firm — Holtz, Holtz & Volek PC

(57) ABSTRACT

Unnecessary degradation of a light detector is prevented. Provided is a microscope apparatus (100) including: a scanner (5) that that performs scanning of illumination light emitted from a light source (3) on a specimen in two directions intersecting each other; an objective lens (7) that collects fluorescence produced in the specimen; a dispersive element (15) that disperses the fluorescence collected by the objective lens (7) into spectral components; a multichannel detector (20) that has a plurality of cells (21) for detecting the spectral components obtained through the dispersion performed by the dispersive element (15); a grouping control section (31) that groups the plurality of cells (21) of the multichannel detector (20) into a used group and an unused group; and a sensitivity control section (33) that turns off the sensitivities of the cells that are grouped into the unused group by the grouping control section (31) or reduces the (Continued)

sensitivities thereof with respect to the sensitivities of the cells that are grouped into the used group.

2 Claims, 4 Drawing Sheets

(58) Field of Classification Search
CPC ...... G02B 21/002; G01N 21/25; G01N 21/64; G01N 21/6458
USPC .......................................................... 348/79
See application file for complete search history.

(56) References Cited

U.S. PATENT DOCUMENTS

| | | | | |
|---|---|---|---|---|
| 6,075,613 | A * | 6/2000 | Schermer | G01N 21/274 356/213 |
| 7,443,508 | B1 * | 10/2008 | Vrhel | G01J 3/10 348/195 |
| 8,565,861 | B2 * | 10/2013 | Taira | A61B 1/043 600/476 |
| 2002/0020819 | A1 | 2/2002 | Wolleschensky et al. | |
| 2004/0121483 | A1 * | 6/2004 | Corson | G01N 21/6428 436/172 |
| 2007/0188754 | A1 * | 8/2007 | Moehler | G01J 3/2803 356/328 |
| 2007/0200052 | A1 * | 8/2007 | Seyfried | G01J 1/02 250/201.3 |
| 2008/0055406 | A1 * | 3/2008 | Ishii | G02B 21/365 348/79 |
| 2010/0210952 | A1 * | 8/2010 | Taira | A61B 1/043 600/476 |
| 2011/0064296 | A1 * | 3/2011 | Dixon | G01N 21/6428 382/133 |
| 2012/0229815 | A1 * | 9/2012 | Langholz | G01N 21/6458 356/601 |
| 2013/0107256 | A1 * | 5/2013 | Mitsuyama | G01N 15/1012 356/343 |
| 2013/0155499 | A1 * | 6/2013 | Dixon | G02B 21/002 359/385 |
| 2013/0301120 | A1 * | 11/2013 | Suzuki | G02B 21/02 359/368 |

FOREIGN PATENT DOCUMENTS

| | | |
|---|---|---|
| JP | 2006-125970 A | 5/2006 |
| JP | 2010-250102 A | 11/2010 |
| JP | 2011017658 A | 1/2011 |
| JP | 2011-100058 A * | 5/2011 |
| WO | WO 2012/008129 A1 * | 1/2012 |

OTHER PUBLICATIONS

Japanese Office Action dated Jan. 10, 2017 issued in Japanese counterpart Application No. 2013-041685.

* cited by examiner

MICROSCOPE APPARATUS FOR PREVENTING UNNECESSARY DEGRADATION OF A LIGHT DETECTOR

CROSS-REFERENCE TO RELATED APPLICATIONS

This application is based on Japanese Patent Application No. 2013-041685, the contents of which are incorporated herein by reference.

BACKGROUND OF THE INVENTION

1. Field of the Invention

The present invention relates to a microscope apparatus.

2. Description of Related Art

There are conventionally known scanning-type confocal microscope apparatuses (LSMs) that have a multichannel detector (photomultiplier tube, PMT) in which a plurality of cells are disposed in an array (for example, see Japanese Unexamined Patent Application, Publication No. 2010-250102). With such an LSM, a fluorescence wavelength profile of a fluorescent reagent introduced in a specimen can be acquired in a short time. Furthermore, by grouping the plurality of cells according to the fluorescence wavelength and adding the outputs of the cells, it is possible to use this LSM like a single PMT, which makes it possible to realize an improved degree of freedom of wavelength selection and to eliminate a filter.

However, in the multichannel detector used in the scanning-type confocal microscope apparatus (LSM) described in Japanese Unexamined Patent Application, Publication No. 2010-250102, the sensitivity cannot be adjusted for each of the cells. Thus, in order to adjust the sensitivity, the sensitivities of all the cells, including cells that are not subjected to addition, are collectively adjusted.

Therefore, when strong light, such as excitation light, enters one cell, it is likely that sensitivity degradation occurs in the cell the strong light has entered, thus causing unnecessary sensitivity degradation of that cell.

The present invention provides a microscope apparatus capable of preventing unnecessary degradation of the light detector.

BRIEF SUMMARY OF THE INVENTION

According to one aspect, the present invention provides a microscope apparatus including: a scanning part that performs scanning of illumination light emitted from a light source on a specimen in two directions intersecting each other; an objective lens that collects fluorescence produced in the specimen; a dispersive element that disperses the fluorescence collected by the objective lens into spectral components; a light detector that has a plurality of cells for detecting the spectral components obtained through the dispersion performed by the dispersive element and that can adjust sensitivities of the cells; a grouping control section that groups the plurality of cells of the light detector into a used group and an unused group; and a sensitivity control section that turns off the sensitivities of the cells that are grouped into the unused group by the grouping control section or reduces the sensitivities thereof with respect to the sensitivities of the cells that are grouped into the used group.

According to this aspect, fluorescence produced from the specimen is collected by the objective lens and is dispersed by the dispersive element into spectral components, and then the spectral components enter the plurality of cells of the light detector. In the light detector, the plurality of cells are grouped into the used group and the unused group by the grouping control section, and spectral components of the fluorescence that have entered the cells of the used group are detected.

In this case, the sensitivity control section turns off the sensitivities of the cells of the unused group or reduces the sensitivities thereof compared with the sensitivities of the cells of the used group, thereby making it possible to prevent unnecessary degradation of the light detector caused when the fluorescence from the specimen and light, such as excitation light, having intensity higher than the fluorescence enter the cells of the unused group.

In the above-described aspect, the scanning part includes an input section for inputting, to the sensitivity control section, a first synchronization signal that is synchronized with timing of scanning in one scanning direction and a second synchronization signal that is synchronized with timing of scanning in the other scanning direction; and the sensitivity control section controls the sensitivities of the cells of the unused group, in synchronization with the first synchronization signal or the second synchronization signal, which is input from the input section of the scanning part.

With this configuration, while removing overlapping (crosstalk) of fluorescence wavelengths, the sensitivity control section can suppress the sensitivity degradation of the cells of the unused group and prevent unnecessary degradation of the light detector.

According to the present invention, an advantageous effect is afforded in that unnecessary degradation of the light detector can be prevented.

DETAILED DESCRIPTION OF THE INVENTION

A microscope apparatus according to one embodiment of the present invention will be described below with reference to the drawings.

Figure 1:
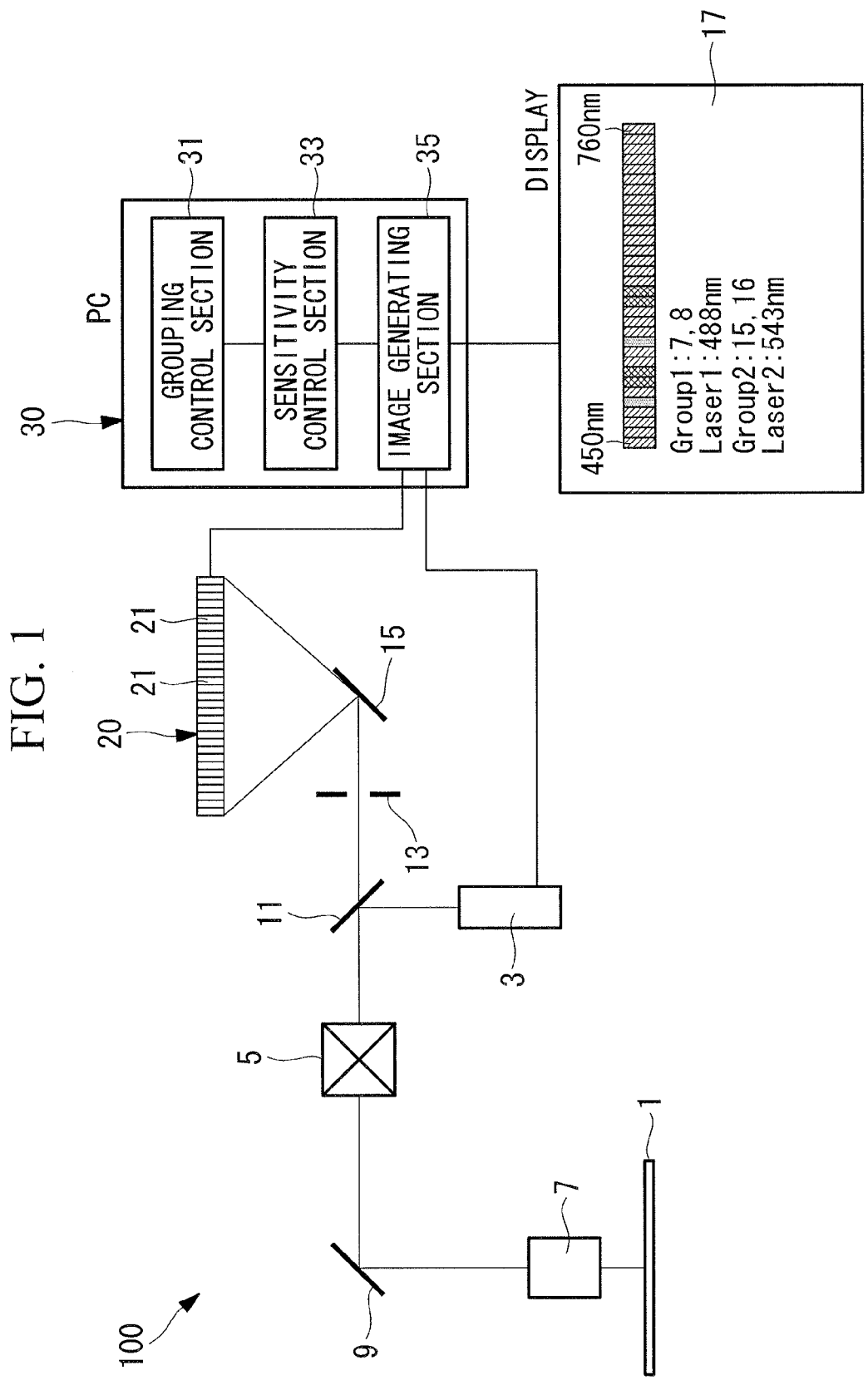
FIG. 1 is a diagram showing, in outline, the configuration of a microscope apparatus according to one embodiment of the present invention.

As shown in FIG. 1, a microscope apparatus 100 of this embodiment includes a stage 1 on which a specimen (not shown) is placed, a light source 3 that emits laser light (excitation light), a scanner (scanning part) 5 that reflects the laser light emitted from the light source 3 to scan the laser light on the specimen, and an objective lens 7 that radiates the laser light reflected by the scanner 5 onto the specimen and that collects fluorescence produced in the specimen. In FIG. 1, reference numeral 9 indicates a reflective mirror that reflects the laser light coming from the scanner 5 to make it enter the objective lens 7.

Furthermore, the microscope apparatus 100 includes a dichroic mirror 11 that reflects the laser light emitted from the light source 3 toward the scanner 5 and that transmits the fluorescence tracing the optical path in reverse from the specimen via the objective lens 7; a confocal pinhole 13 that partially transmits the fluorescence transmitted through the dichroic mirror 11; a dispersive element 15 that disperses the fluorescence transmitted through the confocal pinhole 13 into spectral components for respective wavelengths; a multichannel detector (light detector) 20 that has a plurality of cells 21 for detecting the spectral components, which are obtained through the dispersion performed by the dispersive element 15; a PC (Personal Computer) 30 that controls the light source 3 and the multichannel detector 20; and a display 17 that displays a specimen image etc. and through which an instruction is input by a user.

The scanner 5 includes a pair of galvanometer mirrors (not shown, scanning mirrors) that can be swiveled about swivel shafts intersecting each other, so that the scanner 5 is driven by a raster scan method by changing the swivel angles of the pair of galvanometer mirrors. Thus, the scanner 5 can scan the laser light two-dimensionally on the specimen.

The confocal pinhole 13 is disposed at a position conjugate to the position of the pupil of the objective lens 7, so that only fluorescence that is produced from the focal position of the laser light on the specimen can be transmitted therethrough.

A prism or a diffraction grating is used as the dispersive element 15, for example.

The multichannel detector 20 is configured by arranging the plurality of cells 21 in one dimension, and light beams having different wavelengths, into which the fluorescence is dispersed by the dispersive element 15, enter the respective cells 21. Furthermore, in the multichannel detector 20, the sensitivity can be adjusted for each of the cells 21.

Each of the cells 21 converts the luminance of a detected spectral component into an electrical signal and sends it to the PC 30. As the multichannel detector 20, for example, 32CH multi-anode PMT (Hamamatsu Photonics K.K.), which is configured by arranging 32 cells 65 in one dimension, can be adopted.

The PC 30 includes a grouping control section 31 that groups the plurality of cells 21 of the multichannel detector 20 into a used group and an unused group according to an instruction from the user, a sensitivity control section 33 that controls the sensitivities of the cells 21, and an image generating section 35 that generates an image of the specimen based on the electrical signals of the luminance sent from the cells 21.

When the cells 21 are grouped by the grouping control section 31, the sensitivity control section 33 applies voltage (HV) to cells 21*a* of the used group (turns them ON) and does not apply voltage (HV) to cells 21*b* of the unused group (turns them OFF). Thus, the sensitivity control section 33 turns on the sensitivities of the cells 21*a* of the used group and turns off the sensitivities of the cells 21*b* of the unused group.

The display 17 sets up a monitor for displaying an image of the specimen generated by the image generating section 35 and also sets up a GUI (graphical user interface). With the GUI displayed on the display 17, the user can select a group of cells 21 of the multichannel detector 20 and can select the wavelength of laser light to be emitted from the light source 3.

The display 17 can display, in addition to an image of the specimen, the ON/OFF states of the cells 21 of the multichannel detector 20, the numbers of cells 21 in each group, and the wavelength of the laser light.

The operation of the thus-configured microscope apparatus 100 will now be described.

In order to observe a specimen by using the microscope apparatus 100 of this embodiment, first, the user places a specimen that is stained with multiple fluorescent reagents, on the stage 1. Furthermore, the user performs setting of the dispersive element 15, grouping of the cells 21 of the multichannel detector 20, and selection of laser light.

In this embodiment, for example, Alexa Fluor 488 and Alexa Fluor 546 are used as the fluorescent reagents.

The user sets the dispersive element 15 such that fluorescence in a wavelength band from 450 nm to 760 nm enters the multichannel detector 20, and the wavelength range to be detected by each cell 21 is 10 nm, for example.

Furthermore, from the GUI displayed on the display 17, the user selects two cells 21 numbered 7 and 8 (500 to 520 nm), which correspond to a fluorescence peak wavelength band of Alexa Fluor 488, and two cells 21 numbered 15 and 16 (580 to 600 nm), which correspond to a fluorescence peak wavelength band of Alexa Fluor 546. Furthermore, the user selects, as laser light to be emitted from the light source 3, laser light having an excitation wavelength (488 nm) for Alexa Fluor 488 and laser light having an excitation wavelength (543 nm) for Alexa Fluor 546.

Then, the grouping control section 31 of the PC 30 groups, among the plurality of cells 21 of the multichannel detector 20, the cells 21 numbered 7, 8, 15, and 16 into the used group and the cells 21 numbered 1 to 6, 9 to 14, and 17 to 32 into the unused group.

At this time, as shown in FIG. 1, the display 17 displays the cells 21*a* numbered 7 and 8 as Group 1, laser light having the excitation wavelength of 488 nm as Laser 1, the cells 21*a* numbered 15 and 16 as Group 2, and laser light having the excitation wavelength of 543 nm as Laser 2, for example.

Figure 2:
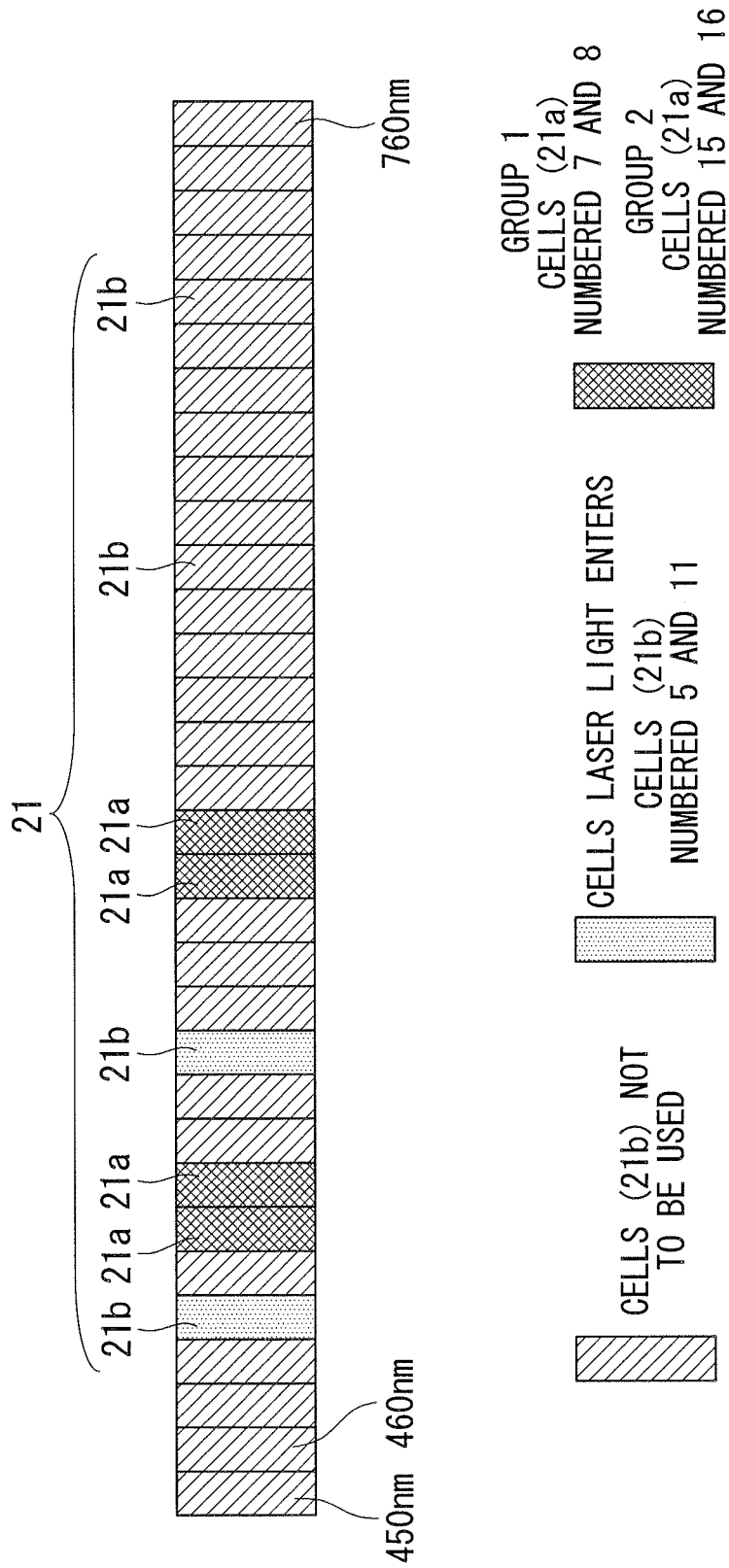
FIG. 2 is a diagram showing ON/OFF states of cells of a multichannel detector shown in FIG. 1.

Then, as shown in FIG. 2, the sensitivity control section 33 turns on the sensitivities of the cells 21*a* (numbered 7, 8, 15, and 16) of the used Group 1 and Group 2. On the other hand, the sensitivity control section 33 turns off the sensitivities of the cells 21*b* (numbered 5 and 11) that the reflected light of laser light beams having the excitation wavelengths for Alexa Fluor 488 and Alexa Fluor 546 enter and the sensitivities of the other cells 21*b* (numbered 1 to 4, 6, 9, 10, 12 to 14, and 17 to 32) of the unused group.

Next, the light source 3 is operated to emit laser light beams having the selected excitation wavelengths. For example, when laser light having the excitation wavelength of 488 nm is emitted from the light source 3, the laser light is reflected at the dichroic mirror 11, is then reflected by the galvanometer mirrors in the scanner 5, and is radiated onto the specimen by the objective lens 7 via the reflective mirror 9.

When the laser light is radiated onto the specimen, Alexa Fluor 488, which is the fluorescent reagent, is excited to produce fluorescence. The produced fluorescence is collected by the objective lens 7, traces the optical path in reverse via the reflective mirror 9 and the scanner 5, and is transmitted through the dichroic mirror 11.

Of the fluorescence transmitted through the dichroic mirror 11, only fluorescence produced from the focal position of the laser light on the specimen passes through the confocal pinhole 13 and is dispersed into spectral components by the dispersive element 15. The spectral components obtained through the dispersion enter the cells 21 of the multichannel detector 20 corresponding to their wavelength bands and are converted by the cells 21 into electrical signals corresponding to the luminance of their wavelengths, and the electrical signals are sent to the PC 30.

This operation is continued until the scanner 5 performs scanning for one frame of an image, and the image generating section 35 generates the image of the specimen based on the electrical signals of the luminance sent from the cells 21. Thus, the image of the specimen using Alexa Fluor 488 as fluorescent labeling is displayed on the display 17.

Next, when laser light having the excitation wavelength of 543 nm is emitted from the light source 3, the laser light is radiated onto the specimen in the same way as the laser light having the excitation wavelength of 488 nm, and Alexa Fluor 546, which is the fluorescent reagent, is excited to produce fluorescence. The fluorescence produced in the specimen is dispersed into spectral components by the dispersive element 15, in the same way as the fluorescence produced from Alexa Fluor 488, and the spectral components are detected by the cells 21 of the multichannel detector 20 corresponding to their wavelength bands. Then, electrical signals corresponding to the luminance of their wavelengths are sent from the cells 21 to the PC 30.

This operation is continued until the scanner 5 performs scanning for one frame of an image, and the image generating section 35 generates the image of the specimen based on the electrical signals of the luminance sent from the cells 21. Thus, the image of the specimen using Alexa Fluor 546 as fluorescent labeling is displayed on the display 17.

In this case, together with the fluorescence, which is produced when the laser light is radiated onto the specimen, the laser light reflected at the specimen traces the same optical path as the fluorescence and enters the multichannel detector 20. With respect to this, the sensitivity control section 33 turns off the sensitivities of the cells 21b of the unused group, thereby making it possible to prevent a situation in which fluorescence having wavelength bands other than the desired wavelength bands (in this embodiment, 500 to 520 nm and 580 to 600 nm) and the laser light reflected at the specimen enter the cells 21b of the unused group corresponding to their wavelength bands, thus causing unnecessary sensitivity degradation.

Specifically, it is possible to prevent unnecessary degradation of the detector caused when spectral components having wavelength bands other than the fluorescence peak wavelength bands of Alexa Fluor 488 and Alexa Fluor 546 enter the cells 21b numbered 1 to 6, 9 to 14, and 17 to 32 of the unused group. Furthermore, it is possible to prevent degradation of the detector caused when the reflected light of the laser light beams having excitation wavelengths for Alexa Fluor 488 and Alexa Fluor 546 enters the cells 21b numbered 5 and 11.

As described above, according to the microscope apparatus 100 of this embodiment, the sensitivity control section 33 turns off the sensitivities of the cells 21b of the unused group, thereby making it possible to prevent fluorescence coming from the specimen and light, such as laser light, having intensity higher than the fluorescence from entering the cells 21b of the unused group. Thus, the multichannel detector 20 can be prevented from being unnecessarily degraded.

This embodiment can be modified as follows.

In a first modification, for example, the PC 30 may include a registration section (not shown) that registers group settings of the cells 21 grouped for the fluorescent reagents by the grouping control section 31. Furthermore, according to the group settings of the cells 21 for the fluorescent reagents registered in the registration section, the sensitivity control section 33 may alternately switch the sensitivities of the cells 21 corresponding to the fluorescent reagents, in synchronization with the scanning timing of the galvanometer mirrors of the scanner 5.

Furthermore, the scanner 5 may include a signal output section (input section, not shown) for sending, to the sensitivity control section 33, a horizontal synchronization signal (first synchronization signal) that is synchronized with the scanning timing of one of the galvanometer mirrors and a vertical synchronization signal (second synchronization signal) that is synchronized with the scanning timing of the other galvanometer mirror.

Furthermore, for example, the sensitivity control section 33 may switch the sensitivities of the cells 21 in synchronization with the horizontal synchronization signal sent from the signal output section of the scanner 5, and the image generating section 35 may generate an image of the specimen by accumulating the electrical signals of the luminance for each fluorescent reagent.

The operation of the thus-configured microscope apparatus 100 of this modification will now be described.

When the user selects, from the GUI displayed on the display 17, the cells 21 corresponding to the fluorescence peak wavelength bands of the fluorescent reagents and selects laser light beams having excitation wavelengths for the fluorescent reagents, the grouping control section 31 groups the plurality of cells 21 of the multichannel detector 20 into the used group and the unused group, and the sensitivity control section 33 turns on the sensitivities of the cells 21a of the used group and turns off the sensitivities of the cells 21b that excitation light enters and the sensitivities of the other cells 21b of the unused group, which is the same as the above-described embodiment.

Figure 3:
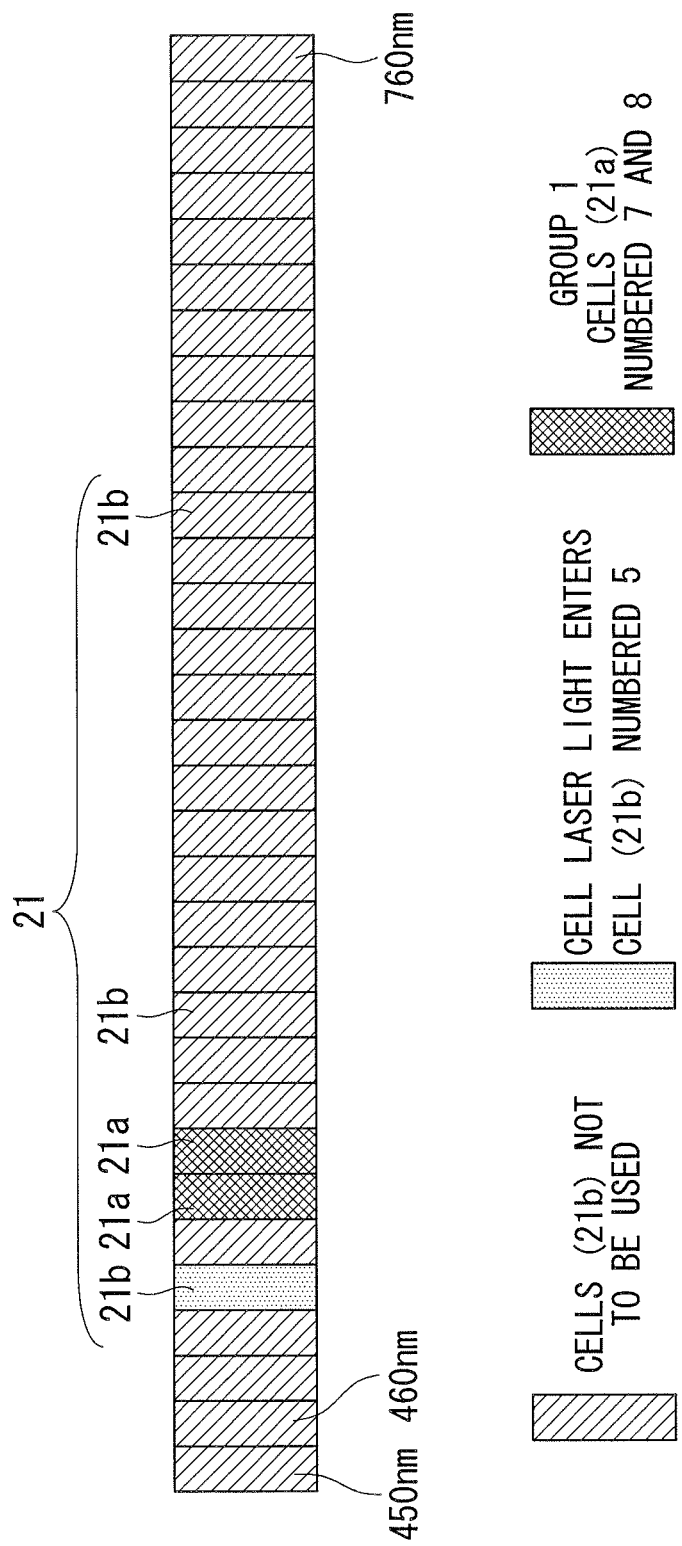
FIG. 3 is a diagram showing ON/OFF states of cells of a multichannel detector according to a first modification of the embodiment of the present invention, under a condition 1.

In this modification, as shown in FIG. 3, the registration section registers, as a condition 1, settings in which the sensitivities of the cells 21a (numbered 7 and 8) of the used group, which correspond to the fluorescence peak wavelength band of Alexa Fluor 488, are turned on, and the sensitivity of the cell 21b (numbered 5), which laser light for Alexa Fluor 488 enters, and the sensitivities of the other cells 21b (numbered 1 to 4, 6, and 9 to 32) of the unused group are turned off.

Figure 4:
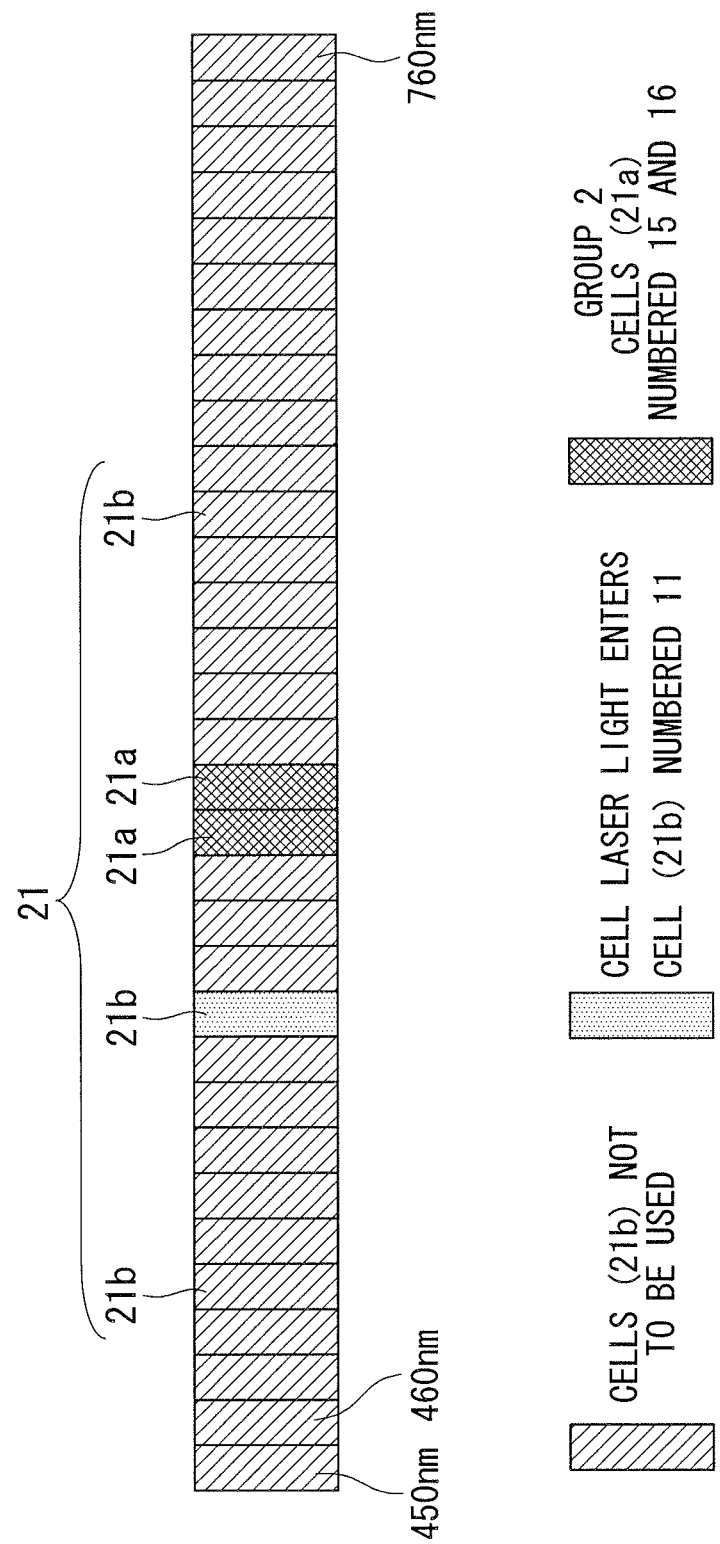
FIG. 4 is a diagram showing ON/OFF states of the cells of the multichannel detector according to the first modification of the embodiment of the present invention, under a condition 2.

Furthermore, as shown in FIG. 4, the registration section registers, as a condition 2, settings in which the sensitivities of the cells 21a (numbered 15 and 16) of the used group, which correspond to the fluorescence peak wavelength band of Alexa Fluor 546, are turned on, and the sensitivity of the cell 21b (numbered 11), which laser light for Alexa Fluor 546 enters, and the sensitivities of the other cells 21b (numbered 1 to 10, 12 to 14, and 17 to 32) of the unused group are turned off.

Then, when the light source 3 emits laser light, and the scanner 5 starts scanning of the laser light on the specimen, the sensitivity control section 33 switches the sensitivities of the cells 21 between the conditions 1 and 2 in synchronization with the horizontal synchronization signal sent from the scanner 5, according to the settings of the conditions 1 and 2 registered in the registration section.

Thus, every time the scanner 5 performs scanning for one line, the cells 21 are alternately switched between on and off corresponding to the fluorescent reagents, and the image generating section 35 generates images of the specimen for the respective fluorescent reagents.

By doing so, while removing overlapping (crosstalk) of fluorescence wavelengths, sensitivity degradation of the cells 21b of the unused group can be suppressed, thereby preventing unnecessary degradation of the multichannel detector 20.

In this modification, although the sensitivity control section 33 switches the sensitivities of the cells 21 in synchronization with the horizontal synchronization signal, instead of this, the sensitivity control section 33 can switch the sensitivities of the cells 21 in synchronization with the vertical synchronization signal. By doing so, every time the scanner 5 performs scanning for one frame of the image, the cells 21 are alternately switched between on and off corresponding to the fluorescent reagents, and the image generating section 35 generates images of the specimen for the respective fluorescent reagents.

Furthermore, in the above-described embodiment, the sensitivity control section 33 turns off the sensitivities of the cells 21b of the unused group; however, in a second modification, the sensitivity control section 33 may reduce the sensitivities of the cells 21b of the unused group with respect to the sensitivities of the cells 21a of the used group.

By doing so, compared with a case in which the sensitivities of the cells 21b of the unused group are set equal to the sensitivities of the cells 21a of the used group, it is possible to prevent unnecessary degradation of the multichannel detector 20 caused when fluorescence from the specimen and light, such as laser light, having intensity higher than the fluorescence enter the cells 21b of the unused group.

Although one embodiment of the present invention has been described above in detail with reference to the drawings, the specific configuration is not limited to this embodiment, and design changes that do not depart from the scope of the present invention are also encompassed. For example, the present invention is not limited to those applied to the embodiment and the modifications thereof; however, it can be applied to an embodiment in which the embodiment and modifications are appropriately combined and is not particularly limited.

Furthermore, for example, in the above-described embodiment and modifications, although a description has been given of an example case in which Alexa Fluor 488 and Alexa Fluor 546 are used as the fluorescent reagents, the fluorescent reagents are not limited thereto. Furthermore, the cells 21a of the used group and the cells 21b of the unused group are selected according to a fluorescent reagent to be adopted, and how to select the cells is not limited to the example cases shown in the above-described embodiment and modifications.

5 scanner
7 objective lens
15 dispersive element
20 multichannel detector (light detector)
21 cells
31 grouping control section
33 sensitivity control section
100 microscope apparatus

What is claimed is:

1. A method for a microscope apparatus, the method comprising:
performing scanning of illumination light emitted from a light source on a specimen in two directions intersecting each other;
collecting fluorescence produced in the specimen;
dispersing the collected fluorescence into spectral components;
detecting the dispersed spectral components by a light detector that has a plurality of cells, wherein sensitivities of each of the plurality of cells are individually adjustable by individually controlling a voltage which is applied to each of the plurality of cells and used to adjust the sensitivities of each of the plurality of cells;
receiving input from a user for selecting at least one cell from among the plurality of cells of the light detector;
grouping the plurality of cells of the light detector into a used group and an unused group according to the at least one cell selected based on the input by the user;
by individually controlling the voltage which is applied to each of the plurality of cells, turning off sensitivities of cells that are grouped into the unused group or reducing the sensitivities thereof with respect to sensitivities of cells that are grouped into the used group;
generating a first synchronization signal that is synchronized with a timing of scanning in a first scanning direction and generating a second synchronization signal that is synchronized with a timing of scanning in a second scanning direction; and
individually controlling the sensitivities of each of the cells of the unused group by individually controlling the voltage which is applied to each of the plurality of cells, in synchronization with the first synchronization signal or the second synchronization signal.

2. A microscope apparatus comprising:
a pair of galvanometer mirrors that perform scanning of illumination light emitted from a light source on a specimen in two directions intersecting each other;
an objective lens that collects fluorescence produced in the specimen;
one of a prism and a diffraction grating that disperses the fluorescence collected by the objective lens into spectral components;
a light detector that has a plurality of cells for detecting the spectral components obtained through the dispersion performed by the one of the prism and the diffraction grating, wherein sensitivities of each of the plurality of cells are individually adjustable by individually controlling a voltage which is applied to each of the plurality of cells and used to adjust the sensitivities of each of the plurality of cells;
a graphical user interface that includes a display and that is configured to receive input from a user for selecting at least one cell from among the plurality of cells of the light detector; and
a computer that is configured to operate as:
a grouping control section that groups the plurality of cells of the light detector into a used group and an unused group according to the at least one cell selected based on the input by the user; and
a sensitivity control section that, by individually controlling the voltage which is applied to each of the plurality of cells, turns off sensitivities of cells that are grouped into the unused group by the grouping control section or reduces the sensitivities thereof with respect to sensitivities of cells that are grouped into the used group,
wherein the microscope apparatus further comprises a signal output section for sending, to the sensitivity control section, a first synchronization signal that is synchronized with a timing of scanning by the pair of galvanometer mirrors in a first scanning direction and a second synchronization signal that is synchronized with a timing of scanning by the pair of galvanometer mirrors in a second scanning direction, and
wherein the sensitivity control section individually controls the sensitivities of each of the cells of the unused group by individually controlling the voltage which is applied to each of the plurality of cells, in synchronization with the first synchronization signal or the second synchronization signal, which is sent by the signal output section.

\* \* \* \* \*